United States Patent [19]

Mueller

[11] Patent Number: 4,462,492

[45] Date of Patent: Jul. 31, 1984

[54] COOLING ARRANGEMENT FOR A VISCOUS COUPLING UTILIZED AS A TORQUE CONVERTER BYPASS

[75] Inventor: Robert S. Mueller, Birmingham, Mich.

[73] Assignee: Eaton Corporation, Cleveland, Ohio

[21] Appl. No.: 291,876

[22] Filed: Aug. 11, 1981

[51] Int. Cl.³ .................. F16H 45/02; F16D 13/72
[52] U.S. Cl. ............................. 192/3.29; 192/113 B
[58] Field of Search ................ 192/3.28, 3.29, 3.3, 192/3.31, 113 A, 113 B, 70.12

[56] References Cited

U.S. PATENT DOCUMENTS

| | | | |
|---|---|---|---|
| 3,063,532 | 11/1962 | Jaeschke | 192/113 B |
| 3,208,570 | 9/1965 | Aschauer | 192/113 B |
| 3,648,814 | 3/1972 | Barron | 192/113 B |
| 3,730,315 | 5/1973 | Annis et al. | 192/3.3 |
| 4,317,510 | 3/1982 | Staub | 192/3.29 |

Primary Examiner—George H. Krizmanich
Attorney, Agent, or Firm—C. H. Grace; P. S. Rulon

[57] ABSTRACT

A bypass drive line for a torque converter type automatic transmission in which the bypass drive line includes a viscous coupling and automatic transmission fluid is selectively passed through the periphery of the viscous coupling to provide a flow of cooling fluid around the coupling. The fluid flowing through the coupling enters at one face of the coupling adjacent the periphery of the coupling and then flows around the periphery of the coupling through a major sector of the circular plane of the coupling and then exits at the opposite face of the coupling at a location spaced from the entry location by a minor sector of the circular plane of the coupling, thereby providing a circuitous path through the coupling which provides a flow rate of cooling fluid through the coupling that varies in proportion to the viscosity, and thereby the temperature, of the cooling fluid.

11 Claims, 5 Drawing Figures

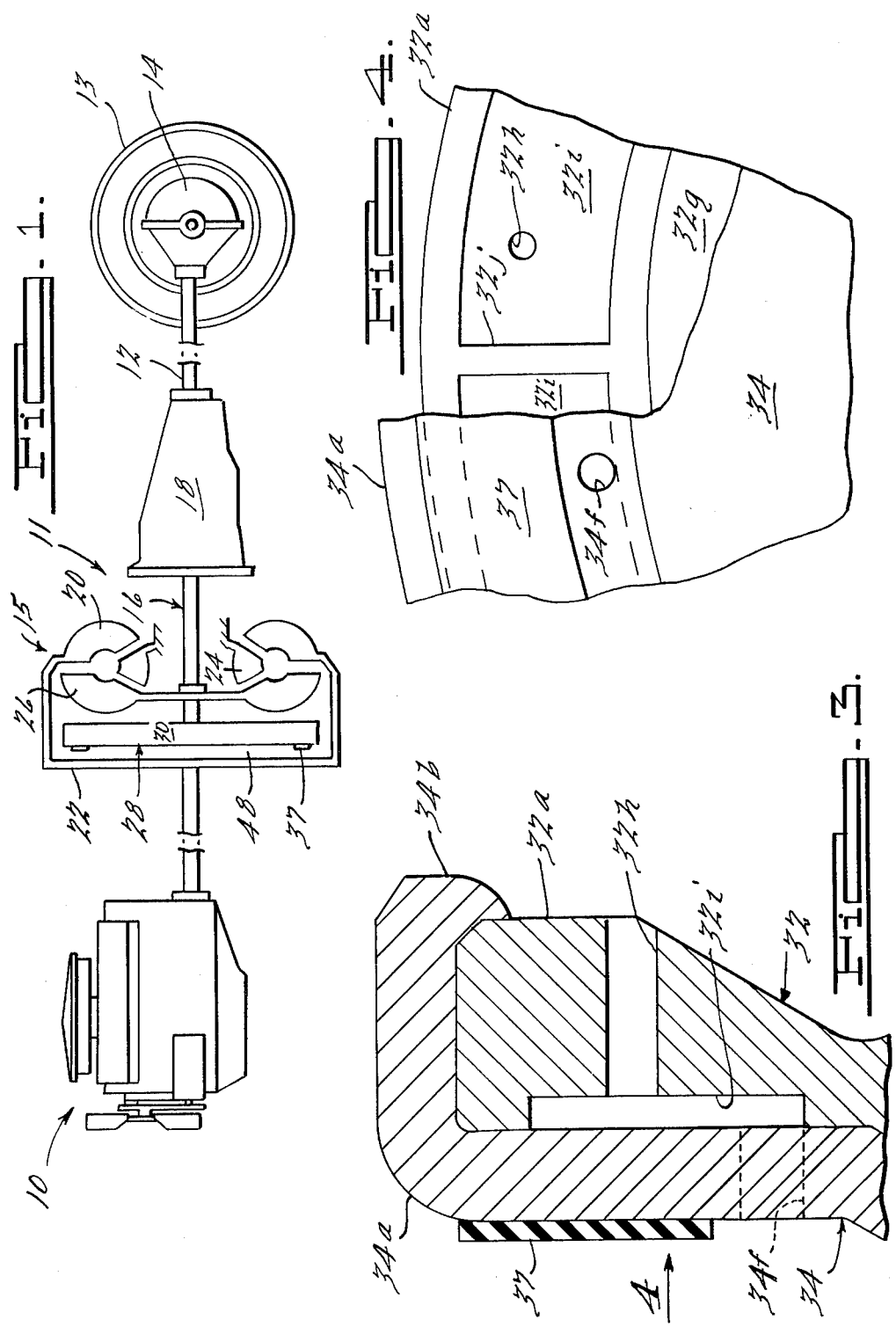

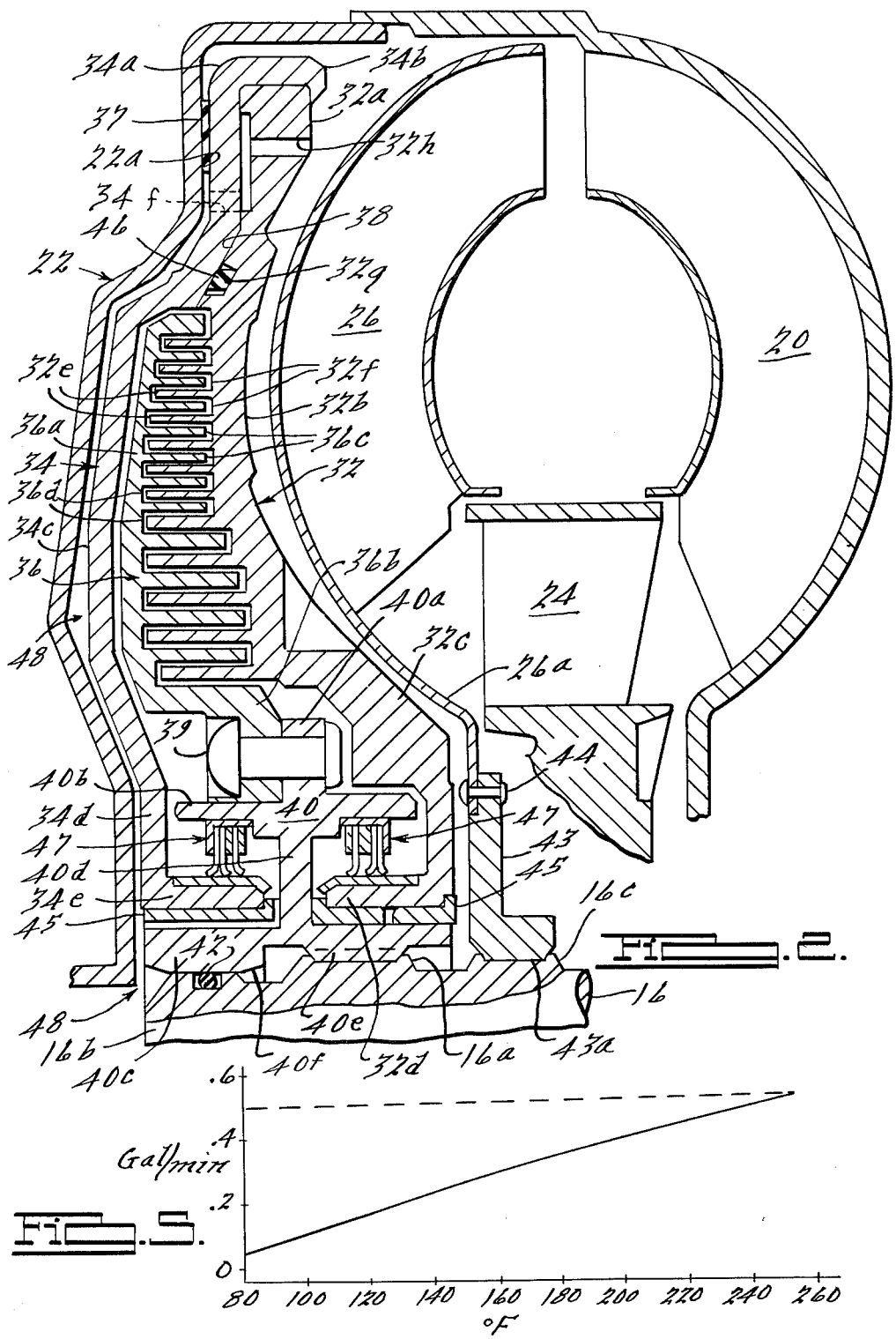

4,462,492

COOLING ARRANGEMENT FOR A VISCOUS COUPLING UTILIZED AS A TORQUE CONVERTER BYPASS

BACKGROUND OF THE INVENTION

This invention relates to automatic torque converter transmissions for motor vehicle applications. More particularly, it relates to automatic torque converter transmissions having means to selectively bypass the torque converter and, even more particularly, to a cooling arrangement for a viscous coupling utilized in a torque converter bypass.

Torque converter type automatic transmissions have achieved almost universal application and acceptance in motor vehicles. While generally satisfactory in this application, torque converter automatic transmissions embody inherent slip and, therefore incorporate inherent losses in vehicular fuel economy. In an effort to minimize this slippage and thereby optimize fuel economy, various efforts have been made to bypass the torque converter with some manner of direct drive which is typically brought into play when the vehicle is operating in the highest gear ratio and above a predetermined vehicular speed. While these direct drive bypass arrangements have resulted in improvements in fuel economy, they have also, under certain conditions, served to transmit various drive line vibrations to the passenger compartment of the motor vehicle, resulting in a derogation in the ride quality of the vehicle. In an effort to provide a bypass arrangement that would not transmit drive line vibration to the passenger compartment, it has been proposed that a viscous coupling be employed in the bypass drivetrain. While the use of a viscous coupling in the bypass drivetrain does serve to minimize transmission of drive line vibrations to the passenger compartment, it is imperative that the temperature of the liquid used in the viscous coupling be carefully controlled to avoid deterioration of the liquid with consequent derogation of the performance of the coupling.

SUMMARY OF THE INVENTION

Accordingly it is an object of the present invention to provide a simple and efficient means for cooling a viscous coupling.

It is a more specific object to provide a simple and efficient means for cooling the viscous coupling employed in a bypass drive train for a torque converter type automatic transmission.

The present invention finds application in any environment which includes a housing for containing a liquid and a partition dividing the housing into first and second liquid chambers sealed from each other by the partition. According to an important feature of the invention, an elongated narrow passage extends circuitously through the partition. The passage has a single entrance at one end opening in a first surface area on one side of the partition and a single exit at its other end opening in a second surface area on the other side of the partition. The passage is defined between its entrance and exit by a single continuous imperforate wall surface and has an effective length at least several times greater than the effective distance between the first and second surfaces of the partition, whereby to provide a long and narrow, but large surface area, flow path between the liquid chambers to provide a rate of liquid flow through the passage between the chambers that varies significantly with variations in the viscosity, and thereby the temperature, of the liquid.

In the disclosed automatic transmission environment, the liquid housing is constituted by the housing of the automatic transmission; the partition within the housing is constituted by a generally circular and generally planar viscous coupling in a torque converter bypass drivetrain; and the cooling liquid passage extends circuitously through the viscous coupling to interconnect liquid chambers defined on either side of the viscous coupling and provide a variable flow of cooling liquid for the viscous coupling.

In the disclosed specific embodiment of the invention, the cooling liquid passage is defined by a first bore opening at its outer end in one side face of the viscous coupling adjacent the periphery of the coupling, a second bore opening at its outer end in the opposite side face of the coupling adjacent the periphery of the coupling, and a groove defined within the coupling and interconnecting the inner ends of the bores. The bores are spaced circumferentially by a minor sector of the circular plane of the coupling and the groove extends circumferentially around the coupling adjacent its periphery through a major sector of the circular plane of the coupling. Means are provided to preclude liquid communication between the two groove ends across the minor sector of the coupling, whereby to define a circuitous but continuous liquid path extending from one liquid chamber, through the first bore, around the groove along the major sector, and thence through the second bore to the second liquid chamber.

These and other objects features and advantages of the invention will become apparent from the following detailed description of the Preferred Embodiment of the Invention.

BRIEF DESCRIPTION OF THE DRAWING

FIG. 1 is a schematic view of a motor vehicle drivetrain including a torque converter type automatic transmission employing a torque converter bypass drive embodying a viscous coupling;

FIG. 2 is fragmentary view on an enlarged scale of the viscous coupling seen schematically in FIG. 1;

FIG. 3 is a fragmentary view on a yet further enlarged scale of the portion of the viscous coupling of FIG. 2;

FIG. 4 is a fragmentary view of the viscous coupling looking in the direction of the arrow 4 in FIG. 3; and FIG. 5 is a graph showing a plot of the flow rate of cooling liquid through the viscous coupling versus the temperature of the cooling liquid.

DETAILED DESCRIPTION OF THE PREFERRED EMBODIMENT

The motor vehicle drivetrain seen schematically in FIG. 1 includes an internal combustion engine 10, an automatic transmission 11, and a propeller shaft 12 driving rear wheels 13 through a differential 14.

Transmission 11 includes a torque converter 15 having an output shaft 16, and a gear ratio box 18 driven by torque converter output shaft 16. Torque converter 15 is filled with automatic transmission fluid and includes, in known manner, a pump 20 driven from engine 10 through torque converter housing 22, a stator 24, and a turbine 26 driven by pump 20 and driving torque converter output shaft 16.

Torque converter 15 further includes a bypass drive line seen generally at 28. Bypass drive line 28 is effective when actuated to provide a direct drive between torque converter housing 22 and torque converter output shaft 16 through a viscous coupling 30, thereby bypassing the high slippage drive path through pump 20 and turbine 26.

Viscous coupling 30 is best seen in FIG. 2. Coupling 30 is generally circular and generally planar and is of a sandwich construction including a first outer member or body 32, a second outer member or cover 34, and a central member or clutch 36 interposed between body 32 and cover 34. Cover 34 is preferably formed as an aluminum stamping and body 32 and clutch 36 are preferably formed as permanent mold aluminum castings.

Body 32 includes a radially outer peripheral portion 32a, an intermediate portion 32b, and a radially inner portion 32c terminating in a hub portion 32d. Intermediate portion 32b is machined on its inner face to form a series of annular lands 32e separated by a series of annular grooves 32f. Another annular groove 32g is machined in the inner face of intermediate portion 32b radially outwardly of lands and grooves 32e, 32f.

Cover 34 includes a radially outer peripheral portion 34a rolled over at 34b to firmly grasp peripheral portion 32a of body 32, an intermediate portion 34c and a radially inner portion 34d terminating in a hub portion 34e. An annular clutch lining 37 is adhesively secured to outer peripheral portion 34a for clutching coaction with the confronting inner surface 22a of torque converter housing 22.

The outer peripheral portions 32a and 34a of the body and cover are configured to nest snugly against each other to form an annular radially extending interface 38 and intermediate portions 32b and 34c of the body and cover are configured to define a chamber therebetween, radially inwardly of interface 38, for receipt of clutch 36.

Clutch 36 includes a working portion 36a and a mounting portion 36b. The side of working portion 36a confronting body 32 is machined to form a series of annular lands 36c separated by a series of annular grooves 36b. Lands 32e on body 32 are interdigitally arranged with respect to lands 36c on clutch 36. Mounting portion 36b is secured by rivets 39 to a central hub member 40.

Hub member 40 is formed as an iron casting and includes an radial mounting flange portion 40a receiving rivets 39, an outer cylindrical portion 40b, an inner cylindrical portion 40c concentric with respect to outer cylindrical portion 40b, and a web portion 40d interconnecting cylindrical portions 40b and 40c. The inner periphery of inner cylindrical portion 40c is splined at 40e for coaction with a splined portion 16a of output shaft 16. The inner periphery of inner cylindrical portion 40c also forms a cylindrical sealing surface 40f for coaction with an O-ring 42 mounted in an annular groove in end portion 16b of shaft 16. Shaft 16 also includes a splined portion 16c for coaction with splines 43a formed on the inner periphery of an annular mounting member 43 secured as by rivets 44 to the radially inner edge of mounting portion 26a of turbine 26, whereby to drivingly connect turbine 26 to torque converter output shaft 16.

Hubs 32d and 34e of the body and cover of the viscous coupling are journaled respectively on the opposite end portions of inner cylindrical portion 40c of hub member 40 with bronze bushings 45 interposed at the rotary interfaces to facilitate the bearing function.

The viscous coupling is filled with a silicone fluid, e.g. dimethyl polysiloxane. The silicone liquid is prevented from escaping radially outwardly by an elastomeric square cut O-ring seal 46; and a pair of triple lip seals 47, positioned between the outer peripheries of hubs 32d and 34e and the confronting inner peripheries of outer cylindrical portion 40b of hub member 40 prevent the silicone liquid from escaping radially inwardly. Seals 47 also preclude leakage of automatic transmission fluid into the viscous coupling.

In the operation of the bypass driveline 28 as thus far described, automatic transmission fluid is normally admitted to the torque converter environment through the annular passage or chamber 48 formed between cover 34 and the torque converter housing 22. The presence of the fluid in passage 48 acting against cover 34 of the viscous coupling moves the viscous coupling to the right as viewed in FIG. 2 to its disengaged position (seen in FIG. 1) wherein lining 37 is separated from housing surface 22a to form an annular passage past the lining. The fluid thus flows radially outwardly in passage or chamber 48, past lining 37, and into the main chamber of the torque converter. When it is desired to engage the bypass drive line, as, for example, when the vehicle is operating in its highest gear ratio and above a predetermined vehicle speed, the direction of flow of the automatic transmission fluid in the torque converter is reversed by actuation of a suitable solenoid valve, not shown. Specifically, the automatic transmission fluid is now admitted to the main chamber of the torque converter where it acts against body 32 of the viscous coupling and slides the coupling to the left as viewed in FIG. 2, to bring lining 37 into frictional engagement with housing surface 22a. The transmission now drives directly through the viscous coupling to output shaft 16, thereby bypassing the torque converter. Although there is a limited amount of slip in the viscous coupling occurring between body and cover 32, 34 and clutch 36, this slippage is significantly less than the slippage in the torque converter so that the overall efficiency of the transmission is significantly increased with corresponding improvements in vehicular fuel economy. And the viscous coupling, because of its cushioning effect, has the effect of eliminating the drive line vibrations that are transmitted to the passenger compartment in prior art bypass drive lines employing a solid mechanical driving connection.

It is, however, imperative that the temperature of the silicone liquid in the viscous coupling be carefully controlled since this liquid will deteriorate if allowed to overheat. It has previously been proposed to circulate automatic transmission fluid through the viscous coupling, with the coupling in its engaged position, into the passage or chamber 48 from whence it is axially withdrawn from the torque converter. Previous arrangements for providing this circulation have, however, proven to be complex and/or relatively ineffective. The present invention provides a simple and effective means of providing a flow of cooling fluid through the viscous coupling and into the chamber 48.

According to the invention, and as best seen in FIGS. 3 and 4, an elongated narrow passage extends circuitously through the viscous coupling to interconnect the main chamber of the torque converter with chamber 48. The passage includes a first bore 32h in outer peripheral portion 32a of body 32; a secord bore 34f in the outer peripheral portion 34a of cover 34; and an annular groove 32i formed in outer peripheral portion 32a of body 32 and interconnecting bores 32h and 34f.

Bore 32h extends axially and opens at its outer end in the outer face of body peripheral portion 32a in communication with the main chamber of the torque converter.

Bore 34f extends axially and opens at its outer end in the outer face of cover peripheral portion 34a in communication with chamber 48 and at a location in that face that, as seen in FIG. 4, is spaced circumferentially from the circumferential location of bore 32h. The circumferential spacing between bores 32h and 34f may approximate 30° and, in any event, constitutes a minor sector of the circular plane of the viscous coupling.

Groove 32i is formed in the inner face of body peripheral portion 32a and extends circumferentially around body 32 through a major sector of the circular plane of the coupling to communicate at its one end with the inner end of bore 32h and at its other end with the inner end of bore 34f. Although groove 32i is shown as being discontinuous with a land portion 32j left between the ends of the groove, as a practical matter, in a production environment, groove 32i would be machined, along with grooves 32f and 32g, as a continuous annular groove and some manner of dam would then be inserted in the groove between bores 32h and 34f to provide the functional equivalent of land portion 32j.

Bores 32h and 34f and groove 32i will be seen to constitute a single continuous passage extending circuitously through the viscous coupling with a single entrance and a single exit and a single continuous imperforate wall surface between the entrance and exit. In a typical automotive application, the viscous coupling may have a diameter of approximately nine inches; the surfaces 34a and 32a may be separated by an effective distance of 0.3125 inches; bore 32h may have a diameter of 0.062 inches and a length of 0.1875 inches; bore 34f may have a diameter of 0.093 inches and a length of 0.125 inches; and groove 32i may have a depth of 0.03 inches and a radial dimension of 0.40 inches. With these dimensions, the length of the path provided through the viscous coupling is approximately 27 inches, as compared to the 0.3125 inch path that would be provided by a simple bore extending axially through the periphery of the viscous coupling.

This extended circuitous path through the viscous coupling provides an extremely large interface area between the automatic transmission fluid and the walls of the passage and thereby allows the temperature variations in the viscosity of the fluid to significantly impact the flow rate through the passage so that the flow rate varies significantly with variations in the temperature of the automatic transmission fluid. Inlet bore 32h presents a flow area less than that of groove 32i or exit bore 34f and is sized to provide a limit on the flow rate during high termperature, low viscosity operation. Bore 32h, at these high temperatures, acts essentially as a sharp-edged orifice and functions independently of groove 32i and bore 34f to establish the maximum flow rate through the passage. During low temperature, high viscosity operation, the flow rate is determined as a function of the total surface area contacting the liquid as it attempts to move through the passage.

As seen in the solid line in the graph of FIG. 5, whereas the flow rate is practically zero at an automatic transmission fluid temperature of 80° F., it increases to approximately 0.2 gallons/minute at 130° F., 0.4 gallons/minute at 200° F., and 0.5 gallons/minute at 250° F. By comparison, as seen in the dashed line in the graph of FIG. 5, a straight 0.05 inch diameter bore through the coupling provides a flow rate that does not vary significantly over the same temperature range. The invention cooling arrangement will thus be seen to provide a relatively low flow rate of cooling fluid when the transmission is operating at a relatively low temperature, and a relatively high flow rate when the transmission is operating at a relatively high temperature. And, since the temperature of the silicone liquid in the viscous coupling, while higher than that of the automatic transmission fluid, is generally proportional to the temperature of the automatic transmission fluid, the invention cooling arrangement will be seen to provide a rate of flow of cooling liquid that is generally proportional to the temperature of the silicone liquid in the coupling. The invention cooling arrangement will thus be seen to provide a simple and effective means of controlling the temperature of the silicone liquid in the viscous coupling. Specifically, the invention arrangement, as compared to prior art arrangement, is relatively simple to manufacture, involves no valves or other moving parts, requires no costly calibration, provides excellent performance repeatability from unit-to-unit, and is extremely reliable.

While a preferred embodiment of the invention has been illustrated and described in detail it will be apparent that various changes and modifications may be made in the disclosed embodiment without departing from the scope or spirit of the invention.

What is claimed is:

1. An apparatus comprising:
   A. a housing for containing a liquid;
   B. means defining a partition dividing said housing into first and second liquid chambers sealed from each other by said partition, said partition having a generally planar configuration and including a first surface area on one side thereof in wetting juxtaposition to the liquid in said first liquid chamber and a second surface area on the other side thereof in wetting juxtaposition to the liquid in said second liquid chamber; and
   C. means defining an elongated narrow passage extending circuitously through said partition and having a single entrance at one end opening in said first surface area and a single exit at its other end opening in said second surface area, said passage being defined between its entrance and exit by a single continuous imperforate wall surface and having an effective length at least several times greater than the effective distance between said surfaces, to provide a long and narrow, but large surface area, flow path between said chambers to provide a rate of liquid flow through said passage between said chambers that varies significantly with variations in the viscosity, and thereby the temperature, of the liquid.

2. An apparatus according to claim 1 wherein
   D. said passage includes a section that is of reduced cross sectional area relative to the other sections of the passage, said reduced area section being sized to determine the maximum flow rate through said passage under high temperature conditions and the large surface area of the total passage functioning to determine the flow rate through said passage under relative cold temperature conditions.

3. An apparatus according to claim 1 wherein:

D. said apparatus comprises an automatic transmission of the torque converter type, said liquid is automatic transmission fluid, and including a bypass drive line for the torque converter employing a viscous coupling;

E. said housing is constituted by the housing of the torque converter of the automatic transmission;

F. the viscous coupling of the bypass drive line is arranged to move between a disengaged position in which drive occurs through the torque converter and an engaged position in which the viscous coupling clutchingly engages the housing of the torque converter to provide a drive line through the viscous coupling bypassing the torque converter;

G. said viscous coupling, when in its clutchingly engaged position, constitutes said partition means and divides said torque converter housing into said first liquid chamber, constituted by the main chamber of the torque converter, and said second liquid chamber, constituted by a chamber on the opposite side of the viscous coupling; and H. said passage means extends circuitously through the viscous coupling to allow automatic transmission fluid to flow, at a rate that varies with temperature, from the main chamber and through the coupling to the chamber on the opposite side of the coupling.

4. In a wet environment drive system of the type including a housing, a generally circular and generally planar assembly disposed within the housing and adapted to divide the housing into two liquid chambers sealed from each other by the assembly and disposed on opposite sides of the assembly, and means operative to provide selective liquid flow between the two chambers through the assembly as a function of the sensed temperature of the liquid; the improvement wherein said liquid flow means comprises:

A. a first bore in said assembly opening at its outer end in one side face of said assembly in liquid communication with one of said chambers at a location in that side face adjacent the periphery of the assembly;

B. a second bore in said assembly opening at its outer end in the opposite side face of said assembly in liquid communication with the other of said chambers at a location in that side face adjacent the periphery of the assembly and spaced circumferentially from said first bore by a minor sector of the circular plane of said assembly;

C. a groove defined within said assembly and extending circumferentially around said assembly adjacent the periphery thereof through a major sector of said circular plane and communicating at its one end with the inner end of said first bore and at its other end with the inner end of said second bore; and D. means precluding liquid communication between said two groove ends across said minor sector, whereby to define a circuitous but continuous liquid path extending from said one chamber, through said first bore, around said groove along said major sector, and thence through said second bore to said second chamber.

5. A drive system according to claim 4 wherein:

E. said drive system comprises an automatic transmission of the torque converter type and F. said assembly comprises a viscous coupling in a drive line arranged to selectively bypass the torque converter of the automatic transmission.

6. A viscous coupling for use with an automatic transmission of the torque converter type, said coupling comprising an annular assembly adapted to be positioned within the housing of the torque converter and including A. means adjacent the axial center of the assembly adapted to drivingly engage the output shaft of the torque converter;

B. means adjacent the periphery of the assembly adapted to clutchingly engage the housing of the torque converter to transmit drive through the viscous coupling and bypass the torque converter; and C. means defining an elongated narrow passage extending circuitously through the assembly and having a single entrance at one end opening in one side face of the assembly and a single exit at its other end opening in the opposite side face of the assembly, said passage being defined between its entrance and exit by a single continuous imperforate wall surface and having an effective length at least several times greater than the effective distance between said side faces for controlling flow rate of a torque converter liquid from one side of the coupling to the other as a function of viscosity.

7. A viscous coupling according to claim 6 wherein said passage includes a section that is of reduced cross sectional area relative to the other sections of the passage, said reduced area section being sized to determine the maximum flow rate through the passage under high temperature conditions and the large surface area of the total passage functioning to determine the flow rate through said passage under relatively cold temperature conditions.

8. A viscous coupling according to claim 6 wherein said passage means comprises

D. a first axial bore in the assembly opening at its outer end in said one side face of the assembly at a location in that side face adjacent the periphery of the assembly;

E. a second axial bore in the assembly opening at its outer end in said opposite side face of the assembly at a location in that side face adjacent the periphery of the assembly and spaced circumferentially from said first bore by a minor sector of the circular plane of the assembly;

F. a groove defined within the assembly and extending circumferentially around the assembly adjacent the periphery thereof through a major sector of said circular plane and communicating at its one end with the inner end of said first bore and at its other end with the inner end of said second bore; and G. means precluding fluid communication between said two groove ends across said minor sector, whereby to define a circuitous but continuous path extending through said first bore, around said groove along said major sector, and thence through said second bore.

9. A viscous coupling according to claim 8 wherein

H. said annular assembly is of a sandwich construction and includes first and second outer annular members joined together at their perpheries to provide an annular radially extending interface and an inner member positioned within a chamber defined between said outer members radially inwardly of said annular interface;

I. said inner member is adapted to drivingly engage the output shaft of the torque converter;

J. said clutching means comprises an annular clutching surface defined on the outer side face of said second outer member adjacent the periphery thereof;

K. said first bore extends axially through said first outer member adjacent the periphery thereof;

L. said second bore extends axially through said second outer member adjacent the periphery thereof and radially inwardly of said annular clutching surface; and M. said groove is defined at said annular interface between said outer members.

10. A viscous coupling according to claim 9 wherein said first bore presents a cross sectional area that is less than that of said groove or that of said second bore.

11. A viscous coupling according to claim 9 wherein

N. said groove is defined in the inner face of said first outer member.

* * * * *